(12) United States Patent
Hazanchuk

(10) Patent No.: US 9,535,705 B1
(45) Date of Patent: Jan. 3, 2017

(54) FLEXIBLE HARDWARE PROGRAMMABLE SCALABLE PARALLEL PROCESSOR

(71) Applicant: Asher Hazanchuk, Sunnyvale, CA (US)

(72) Inventor: Asher Hazanchuk, Sunnyvale, CA (US)

(*) Notice: Subject to any disclaimer, the term of this patent is extended or adjusted under 35 U.S.C. 154(b) by 318 days.

(21) Appl. No.: 14/458,972

(22) Filed: Aug. 13, 2014

Related U.S. Application Data

(60) Provisional application No. 61/865,418, filed on Aug. 13, 2013.

(51) Int. Cl.
*G06F 9/38* (2006.01)
*G06F 9/30* (2006.01)

(52) U.S. Cl.
CPC .......... *G06F 9/3885* (2013.01); *G06F 9/3001* (2013.01); *G06F 9/3004* (2013.01)

(58) Field of Classification Search
None
See application file for complete search history.

(56) References Cited

U.S. PATENT DOCUMENTS

2012/0079236 A1* 3/2012 Suvakovic ............ G06F 9/3897
712/30

* cited by examiner

*Primary Examiner* — William B Partridge
(74) *Attorney, Agent, or Firm* — Maschoff Brennan

(57) ABSTRACT

In a typical embodiment, a parallel processor is provided that includes:
A plurality of parallel processing units that are interconnected to provide a flexible hardware programmable, scalable and re-configurable parallel processor that executes different functions in a parallel processor space domain instead of a processor (serial processor) time domain. Each parallel processing unit includes a flexible processing engine with its inputs and outputs connected to MDDP-RAM blocks. The MDDP-RAM blocks provide the processing engine with different channels' data and coefficients. The processing engine and the MDDP-RAM blocks are controlled by a system processor (or other control scheme hardware) via the parameter blocks to enable high hardware flexibility and software programmability.

10 Claims, 3 Drawing Sheets

FLEXIBLE HARDWARE PROGRAMMABLE SCALABLE PARALLEL PROCESSOR

CROSS-REFERENCE TO RELATED APPLICATIONS

This application claims the benefit of and priority to U.S. Provisional Application No. 61/865,418, filed Aug. 13, 2013, titled FLEXIBLE HARDWARE PROGRAMMABLE SCALABLE PARALLEL PROCESSOR, which is incorporated herein by reference in its entirety.

TECHNICAL FIELD

This invention relates generally to parallel processors, programmable logic devices and Application-Specific Integrated Circuit (ASIC)/Application-Specific Standard Product (ASSP) devices. More particularly, example embodiments relate to flexible, adaptable, hardware programmable, scalable, optimized size, low power parallel processors targeting digital signal processing or other functions and/or applications.

BACKGROUND

Cloud computing, wireless base stations, smartphones, video, medical imaging, advanced computer graphics and many other applications are computation-intensive and often require multi-core (and/or multi-processor) solutions to match system-required high-processing throughput.

Therefore size efficient multi-core architectures are highly desirable to reduce solution cost and power consumption. Available multi-core solutions are currently based on duplicating (repetition) serial processors in order to meet system processing throughput requirements. These implementation methods are typically memory-size inefficient and have larger-than-needed processing units.

SUMMARY

Example embodiments described herein include a parallel processor architecture that enables higher size-efficiency coupled with a simple programming scheme based on a common system processor. This system processor and parallel processor design split enables easy design flow based mostly on the system processor on-the-shelf software tools.

In an example embodiment, a parallel processor may include a plurality of flexible, re-configurable parallel processing units having inputs and outputs interconnected together with neighboring parallel processing units to provide a parallel processor that executes different functions in the parallel processor space domain instead of the processor (serial processor) time domain. Each parallel processing unit may include a flexible processing engine connected to multiplexed delayed dual-port (MDDP) random access memory (RAM) blocks. The MDDP-RAM blocks may provide the processing engine with data and coefficients. The processing engine and the MDDP-RAM blocks may be controlled by the system processor via parameter blocks to enable high flexibility and easy programmability. One of the typical design flows uses high level instructions that are embedded inside the serial system processor code. A parallel processor pre-compiler translates these high level parameterized instructions (directives) into regular system processor input/output instructions. Parallel processor parameter blocks are accessible to the system processor as an I/O mapped memory. The parameters control could be done in a different embodiment without a processor using a sequencer, configuration read-only memory (ROM) or similar methods.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

Figure 1:
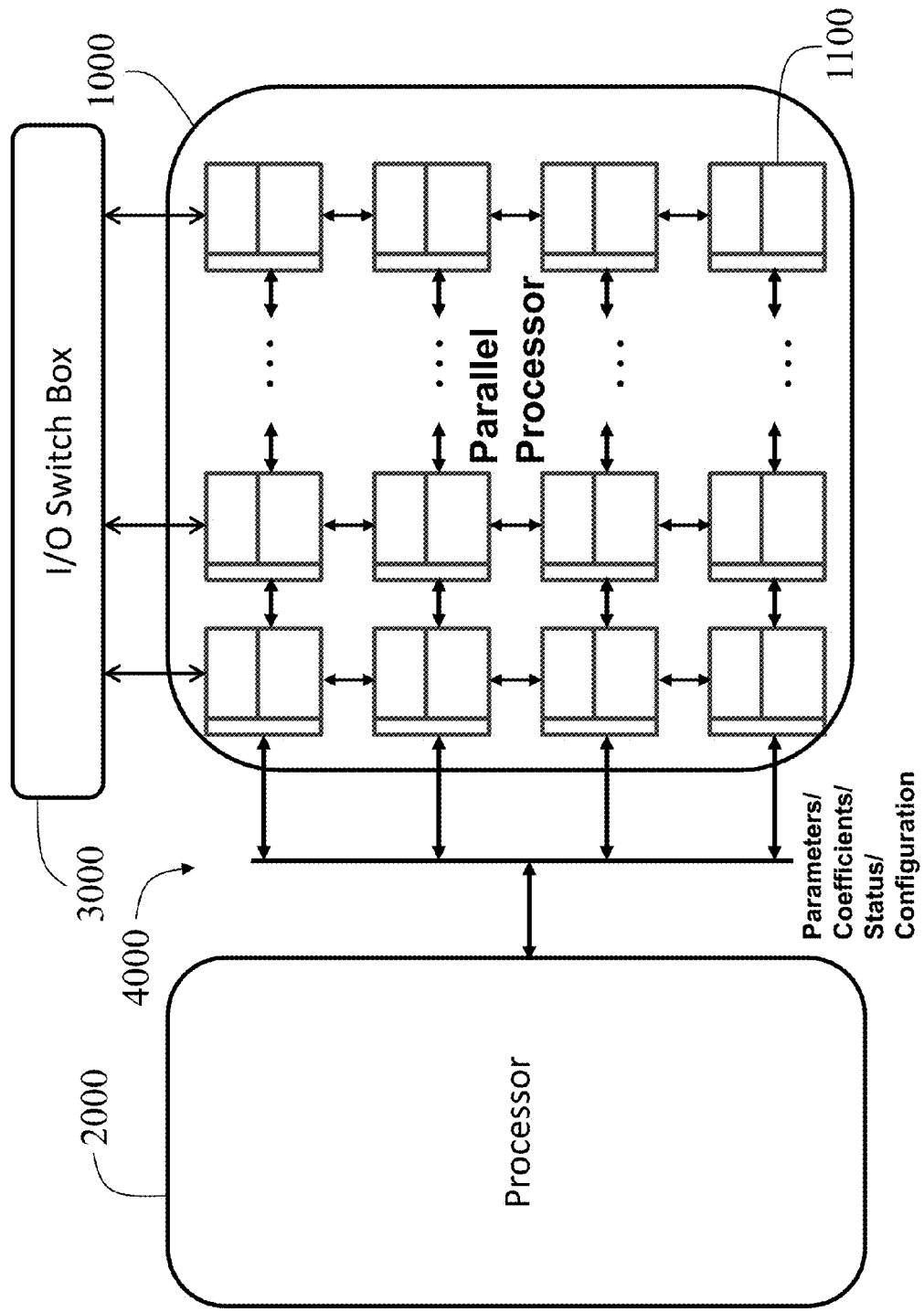
FIG. 1 is a block diagram of a flexible, scalable hardware programmable parallel processor (hereinafter "parallel processor") configured to implement techniques described herein.

Embodiments of the present invention and their advantages are best understood by referring to the detailed description that follows. It should be noted that reference numerals are used to identify elements illustrated in one or more of the figures.

DETAILED DESCRIPTION

While the invention will be described with respect to one or more particular embodiments, it should be understood that the invention is not limited to any particular embodiment. On the contrary, the invention includes alternatives, modifications, and equivalents as may come within the spirit and scope of the appended claims. Furthermore, in the following description, numerous specific details are set forth to provide a thorough understanding of the invention. The invention may be practiced without some or all of these specific details. In other instances, well-known structures and principles of operation have not been described in detail to avoid obscuring the invention.

The concepts and embodiments disclosed herein are applicable to and/or may be incorporated in different types of processors, Field-Programmable Gate Array (FPGA) devices, ASIC devices, ASSP devices or other similar devices.

Reference will now be made to the drawings to describe various aspects of some example embodiments of the invention. The drawings are diagrammatic and schematic representations of such example embodiments, and are not limiting of the present invention, nor are they necessarily drawn to scale.

FIG. 1 is a block diagram of a flexible hardware programmable and scalable parallel processor (hereinafter "parallel processor") 1000 configured to implement techniques described herein. The parallel processor 1000 includes multiple parallel processing units 1100 (only one is labeled in FIG. 1 for simplicity), an example embodiment of which is described in more detail with respect to FIG. 2. The parallel processing units 1100 are configured and, optionally, loaded with specific coefficients by a processor 2000 (sometimes referred to herein as a "system processor"). The term "processor" as used herein may represent or refer to any kind of processor including, but not limited to, a microprocessor, a microcontroller, a controller, a digital signal processor (DSP) processor, a reduced instruction set computing (RISC) processor, a simple sequencer, or the like. The configuration specifics are controlled according to some embodiments by function/functions parameters set up by the processor 2000. A typical design flow supporting this parallel processor programming may include a pre-compiler that translates the high level (function level) processor 2000 instructions (parallel processor special directives) into simple I/O map instructions. In some cases, a system without a processor such as the processor 2000 is feasible. One of the scenarios of such a system without a serial system processor is a fixed configuration parallel processor that is loaded in a methodology similar to FPGA configuration initialization.

Another optional design flow could be based on behavioral or structural synthesis design tools. Common hardware design languages such as Verilog, very-high-speed integrated circuits hardware description language (VHDL), System-C or others could be used to describe embodiments of a parallel processor in different applications and/or implementations.

As mentioned earlier, a source of the parallel processor 1000 input data and its output data destination could be a processor, such as the processor 2000. In this mode of operation the processor 2000 sends data to the parallel processor 1000 to operate on it and later receives the results of the parallel processor operation.

Another mode of operation may include the processor 2000 controlling the functions of the parallel processor 1000, but the input data sources and output data destinations being directly connected through an I/O switch box 3000. The I/O switch box 3000 may be connected to interfaces such as a serializer/deserializer (Serdes), PCI Express, an analog-to-digital converter (ADC)/digital-to-analog converter (DAC), external memory interfaces and/or others.

Still another mode of operation may include the data input source coming from the processor 2000 with the data output destination going to the I/O Switch Box 3000 or the data input source coming from the I/O Switch Box 3000 with the data output destination going to the processor 2000. In some cases, a processor-parallel processor interface 4000 for data input and/or data output may also be used by the processor 2000 to receive status information from the parallel processor 1000.

Figure 2:
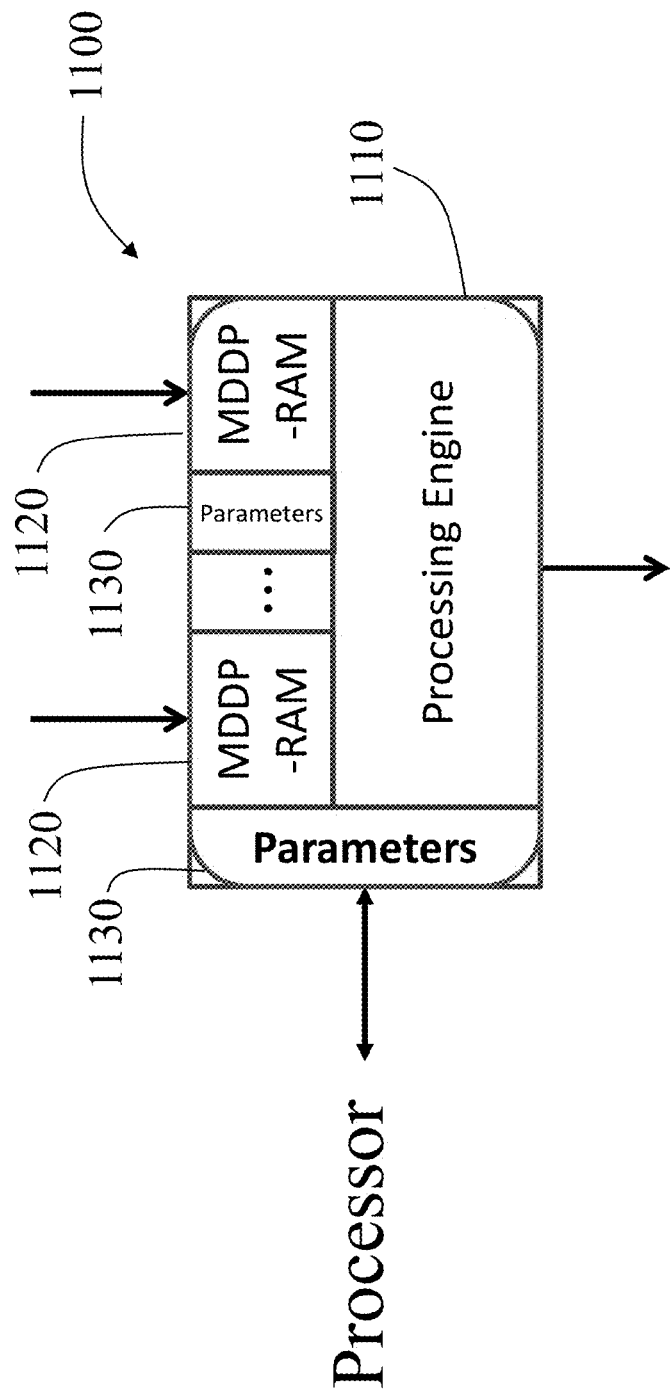
FIG. 2 is a schematic illustration of an example parallel processing unit that may be included in the parallel processor of FIG. 1.

FIG. 2 illustrates an example implementation of each parallel processing unit 1100 of FIG. 1, arranged in accordance with at least one embodiment described herein. The parallel processing unit 1100 of FIG. 2 may include a processing engine 1110, one or more MDDP-RAM blocks 1120 and one or more parameter blocks 1130. The processing engine 1110 may be composed from a pipelined multiplexed group of processing elements or functional elements. The processing elements could be multipliers, adders/subtractors, accumulators, Boolean operators, barrel shifters, counters, data bus/bit level/functional conversion blocks, or/and other processing elements. The processing engine 1110 may additionally include one or more processing engine multiplexers connecting the various processing elements. The input/output data formats of the processing elements of the processing engine 1110 could have any one of various fixed point resolutions, various floating point resolutions, integers, 2's compliment, or others.

Each input of the processing engine 1110 may be connected to an output of a corresponding one of the MDDP-RAM blocks 1120. Each output of the processing engine 1110 may be connected to an input of a corresponding one of the MDDP-RAM blocks 1120. Details of an example embodiment of an MDDP-RAM block 1120 are described with respect to FIG. 3.

The processing engine 1110 and the MDDP-RAM blocks 1120 may be controlled by the parameters blocks 1130. Each parameters block 1130 may control multiplexers, processing engine 1110 element functions, RAM read and write enable signals, RAM read and write addresses, etc. According to some embodiments, the parameters blocks 1130 may be part of the I/O map structure of a processor, such as the processor 2000 of FIG. 1. The parameters blocks 1130 may enable the processor 2000 to read status information from each of the parallel processing units 1100.

Figure 3:
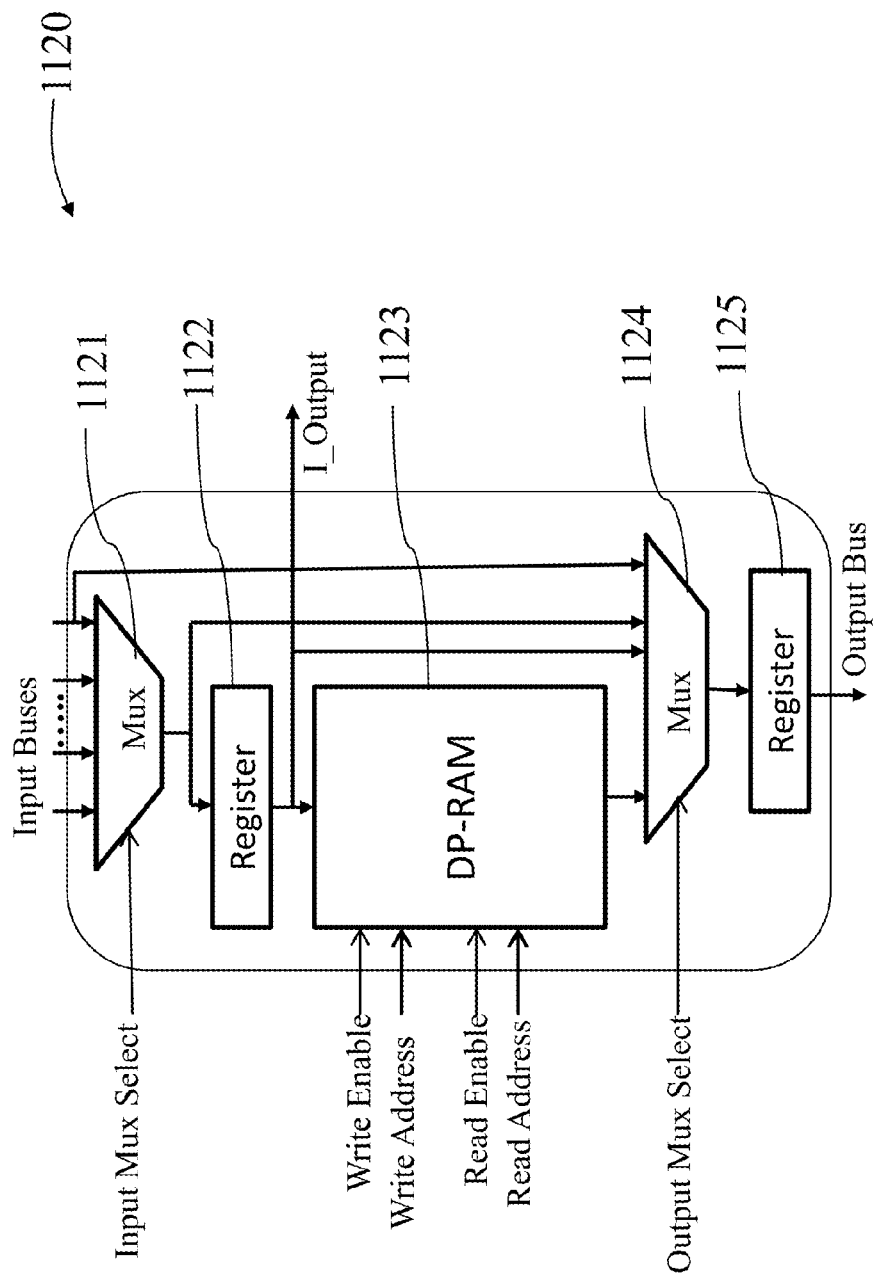
FIG. 3 is a block diagram of an example MDDP-RAM block that may be included in the parallel processing unit of FIG. 2.

FIG. 3 illustrates an example implementation of each MDDP-RAM block 1120 of FIG. 2, arranged in accordance with at least one embodiment described herein. The MDDP-RAM block 1120 of FIG. 3 includes a Dual Port-RAM (DP-RAM) 1123, an input register 1122, an input multiplexer 1121, an output multiplexer 1124, and an output register 1125. The output register 1125 is typically connected to an input of a processing engine, such as an input of the processing engine 1110 of FIG. 2. The output register 1125 receives its input from the output multiplexer 1124. An input to the output multiplexer 1124 may be controlled by an Output Mux Select signal received from, e.g., a neighbor parallel processing unit or the system processor. Accordingly, the input to the output multiplexer 1124 may be selected from an output of the DP-RAM 1123, an output of the input register 1122, an output of the input multiplexer 1121, or directly from one of multiple input buses of the MDDP-RAM block 1120. The output of the input register 1122 is the input to the DP-RAM 1123. The input of the input register 1122 is the output of the input multiplexer 1121. An input to the input multiplexer 1121 may be selected by an Input Mux Select signal received from the processor 2000 or an output of a neighbor parallel processing unit 1100. The input buses of the input multiplexer 1121 may be an output of a neighbor parallel processing unit, or from an output of a processing element of a processing engine 1110 in a same parallel processing unit 1100 as the MDDP-RAM block 1120, or from an output of the MDDP-RAM block 1120 or a neighbor MDDP-RAM block 1120, or from a local or global memory block, or from the I/O switch box 3000, or the like.

Each MDDP-RAM block may have two output buses including an output bus of the output register 1125 (labeled "Output Bus" in FIG. 3) and an output of the input register 1122 (labeled "I_Output" in FIG. 3).

A typical design flow uses high level instructions that are embedded inside the system processor code (e.g., code of the processor 2000 of FIG. 1). The parallel processor pre-compiler may be used to translate such high level parameterized instructions into regular input/output system processor instructions. The parallel processor pre-compiler may be implemented in software executed by the processor 2000 of FIG. 1, for instance. The parallel processor parameters blocks, such as the parameter blocks 1130 of FIG. 2, may be accessible to the system processor, such as the processor 2000 of FIG. 1, as an I/O mapped memory. The software may be embodied as code or computer-executable instructions stored on a tangible and/or non-transitory computer-readable medium. Execution of the software by a processor may cause the processor to perform or control performance of the operations described herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A flexible, hardware programmable, scalable, and reconfigurable parallel processor (parallel processor), comprising:
    a plurality of parallel processing units each including:
        a processing engine including one or more processing elements configured to process input data samples;
        one or more Mux Delay Dual-Port Random Access Memory (MDDP-RAM) blocks; and
        one or more parameter blocks;
    wherein the parallel processing units are connected together to perform processing functions; and
    wherein each of the MDDP-RAM blocks comprises:
        an input multiplexer having an input coupled to multiple first input buses;
        an input register having an input coupled to an output of the input multiplexer;
        a dual-port-random access memory (DP-RAM) having an input coupled to an output of the input register;
        an output multiplexer having an input coupled to multiple second input buses; and
        an output register having an input coupled to an output of the output multiplexer.

2. The parallel processor of claim 1, wherein the processing functions comprise digital signal processor (DSP) functions.

3. The parallel processor of claim 1, wherein the one or more processing elements comprise one or more of: a plurality of multipliers; a plurality of adders and/or subtractors; a plurality of accumulators; a plurality of barrel shifters; a plurality of counters; a plurality of comparators; and a plurality of data buses/bit level/function conversion blocks.

4. The parallel processor of claim 3, wherein the processing engine further comprises one or more processing engine multiplexers connecting different processing elements of the processing engine.

5. The parallel processor of claim 4, wherein each of the one or more parameter blocks is configured to control a function of a corresponding processing engine included in a same parallel processing unit as the one or more parameter blocks, a sequence of data and coefficients processed by the corresponding processing engine, processing engine multiplexers, read and write addresses and control signals of the DP-RAM of each of the corresponding MDDP-RAM blocks included in the same parallel processing unit as the one or more parameter blocks, and the input selection of each of the input and output multiplexers of each of the corresponding MDDP-RAM blocks.

6. The parallel processor of claim 1, wherein: the multiple first input buses to which the input of the input multiplexer is coupled include at least one of: an output of a neighbor parallel processing unit, an output of a processing element of a processing engine in the same parallel processing unit as the MDDP-RAM block, an output of the MDDP-RAM block or a neighbor MDDP-RAM block, an output of a local or global memory block, and an output of the I/O switch box; and the multiple second input buses to which the input of the output multiplexer is coupled include at least one of: one or more of the multiple first input buses, the output of the input multiplexer, the output of the input register, and an output of the DP-RAM.

7. The parallel processor of claim 1, wherein a direct connection between a system processor and the parallel processing units via the one or more parameter blocks enable easy hardware programming and re-configurability.

8. The parallel processor of claim 1, configured to support a simple design flow in which: high-level functional multi-cycle instructions (directives) are embedded inside system processor (serial processor) software; and a pre-compiler, unique to the parallel processor, converts the high-level functional multi-cycle instructions (directives) into regular system processor I/O instructions that control the parallel processor via the one or more parameter blocks.

9. The parallel processor of claim 1, wherein each of the one or more MDDP-RAM blocks is connected directly to a corresponding processing engine in a same parallel processing unit as the one or more MDDP-RAM blocks.

10. The parallel processor of claim 1, wherein the plurality of parallel processing units are interconnected in a mesh topology and are collectively configured to execute functions in a space domain in addition to a time domain.

* * * * *